United States Patent [19]
Biel et al.

[11] 3,876,797
[45] Apr. 8, 1975

[54] DI-SUBSTITUTED β-PHENETHYLCARBAMIC ACID ESTERS IN THE TREATMENT OF PARKINSONISM

[75] Inventors: John Hans Biel, Lake Bluff, Ill.; Irwin L. Klundt, Brookfield, Wis.

[73] Assignee: Aldrich Chemical Company, Milwaukee, Wis.

[22] Filed: Aug. 2, 1973

[21] Appl. No.: 385,007

Related U.S. Application Data

[62] Division of Ser. No. 96,586, Dec. 9, 1970.

[52] U.S. Cl. ................ 424/300; 424/244; 424/285; 424/301

[51] Int. Cl. ............................................ A61k 27/00

[58] Field of Search ..................................... 424/300

[56] References Cited
UNITED STATES PATENTS
3,600,427  8/1971  Verbiscar ..................... 260/471 C

*Primary Examiner*—Stanley J. Friedman
*Attorney, Agent, or Firm*—Robert L. Niblack; Joyce R. Krei

[57] ABSTRACT

Novel di-substituted β-phenethylcarbamic acid esters. The compounds are useful as antidepressants and anti-Parkinsonism agents.

1 Claim, No Drawings

DI-SUBSTITUTED β-PHENETHYLCARBAMIC ACID ESTERS IN THE TREATMENT OF PARKINSONISM

This is a division of application Ser. No. 96,586 filed Dec. 9, 1970.

BACKGROUND OF THE INVENTION

Until recently, patients suffering from Parkinsonism were treated with anticonvulsants, antispasmodics, central nervous system stimulants, and the like, in an attempt to produce temporary amelioration of their complaints. In severe cases, surgical procedures were employed with some success. L-Dopa was the first single agent found to be effective in reversing the akinesia and rigidity of Parkinsonism, particularly in severe cases. An increase in mental alertness and wakefulness, relief from depression, and an increase in intellect has also been observed in patients receiving L-Dopa.

While L-Dopa has produced some rather promising results in experimental therapy and is being used in a limited number of patients, it is not well tolerated by a number of patients. The most frequent side effects are nausea, vomiting, postural hypostension, cardiac dysrhythmia and choreiform movements. The abnormal, involuntary movements pose severe problems to the drug's continued use in approximately 50% of the patients. Furthermore, dopamine itself is not orally active and has a very short duration of action. Thus, the search for more effective, orally-active, long-acting anti-Parkinson agents continues. It is an object of the present invention to provide such agents.

SUMMARY

This invention relates to novel di-substituted β-phenethylcarbamic acid esters represented by the structural formula:

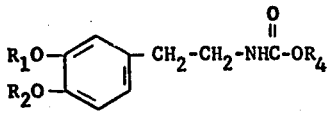

wherein: $R_1$ and $R_2$ are hydrogen, benzyl, substituted benzyl, or

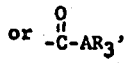

wherein A is O, NH, or S, and $R_3$ is lower alkyl, lower alkenyl, or lower alkynyl; and $R_4$ is lower alkyl, lower alkenyl, lower alkynyl, lower haloalkyl, cyclopropylmethyl, β-(2-furyl)-ethyl or azetidinyl; with the limitation that when A is O and $R_3$ is ethyl, $R_4$ cannot be ethyl, and when $R_1$ and $R_2$ are benzyl, $R_4$ cannot be methyl.

The presently preferred compounds for treating Parkinsonism are those wherein $R_1$ is hydrogen or benzyl; $R_2$ is hydrogen or benzyl; and $R_3$ is ethyl or trichloroethyl, and A is O.

The term "lower alkyl" as used herein refers to both straight and branched chain $C_1$-$C_5$ alkyl groups including methyl, ethyl, n-propyl, iso-propyl, n-butyl, sec-butyl, tert-butyl, iso-butyl, n-pentyl, iso-pentyl, neopentyl, and the like.

"Lower alkenyl" refers to both straight and branched chain alkenyl groups containing from 2 to 5 carbon atoms, such as vinyl, allyl, methallyl, 1-pentenyl,1 and the like.

"Lower alkynyl" refers to $C_3$-$C_5$ alkyl groups as defined above from which two hydrogen atoms have been removed from each of two adjacent carbon atoms to produce acetylenic unsaturation; e.g., propargyl, 2-butynyl, 1-pentynyl, and the like. "Substituted benzyl" refers to a mono-, di-, or tri-substituted benzyl moiety substituted in the ortho, meta and/or para positions by a chloro, fluoro, iodo, bromo, or trifluoromethyl atom.

"Halo" includes chloro, fluoro, bromo, and iodo.

The anti-Parkinson activity of the above compounds was established using the Harmonyl (deserpidine) Antagonism Test. In the Harmonyl test, mice are dosed orally with 50 mg/kg of deserpidine 24 hours prior to drug evaluation. In mice, deserpidine produces ptosis, hunched posture, sedation, catalepsy and rigidity. L-Dopa produces marked reversal of the above effects in mice. Antagonism of the deserpidine effects in mice are graded slight (1), moderate (2) or marked (3), based on the reversal of the Harmonyl effects. The compounds of the invention produce moderate to marked reversal in dosages of from 10 to 200 mg/kg of body weight.

The compounds are generally administered to mammalian Parkinsonism patients in dosages of from 10 to 200 mg/kg of body weight daily, preferably in divided doses. While the compounds exhibit both oral and parenteral activity, the preferred route of administration is the oral route. The oral $LD_{50}$'s of the compounds of this invention in mice are approximately 600–1,000 mg/kg.

The antidepressant activity of the compounds of this invention was first established in the modified dopa test as described by Everett, et al., Fed. Proc., 23 p. 198 (1964). The compounds are useful as antidepressant agents when administered to depressed patients in dosages of from 10 to 200 mg/kg of body weight daily, preferably in divided doses.

Representative compounds of the present invention include 3,4-Dibenzyloxy-β-phenethylcarbamic acid, furfuryl ester,
3,4-Dihydroxy-β-phenethylcarbamic acid, ethyl ester,
3,4-Dihydroxy-β-phenethylcarbamic acid, isopropyl ester,
3,4-Dihydroxyβ-phenethylcarbamic acid, n-butyl ester,
3,4-Dibenzyloxy-62 -phenethylcarbamic acid, β-trichloroethyl ester,
3,4-Dibenzyloxy-β-phenethylcarbamic acid, isopropyl ester,
3,4-Dihydroxy-β-phenethylcarbamic acid, trichloroethyl ester.
3,4-Dihydroxy-β-phenethylcarbamic acid, 3-azetidinyl ester,
3,4-Dibenzyloxy-β-phenethylcarbmic acid, cyclopropylmethyl ester,
3,4-Dithioethoxycarbonyl-β-phenethylcarbamic acid, ethyl ester
3,4-Dimethoxycarbonyl-β-phenethylcarbamic acid, methyl ester
3,4-Dipropargyloxycarbonyl-β-phenethylcarbamic acid, propargyl ester,
3,4-Diallyloxycarabonyl-β-phenethylcarbamic acid, allyl ester The method of synthesis of the compounds of this invention is represented by the following reaction scheme.

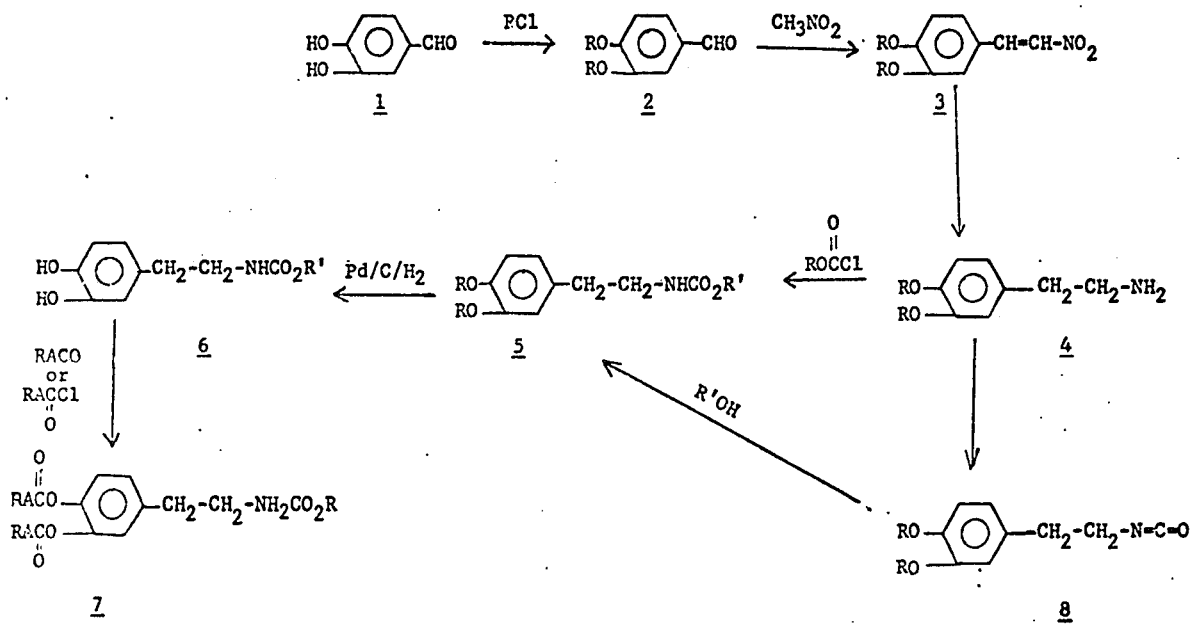

Generally speaking, protocatechualdehyde, 1, (Aldrich Chemical Co.) is reacted with RCl (i.e. benzyl chloride, etc.) to prepare 2-(wherein R=$C_6H_5CH_2$—). 2 is converted to the corresponding β-nitrostyrene, 3, which is treated with lithium aluminum hydride and the resulting amine 4 reacted with an appropriate chloroformate to prepare 5 (R'=loweralkyl, etc.) or the amine 4 can be converted to the isocyanate 8 and then reacted with an appropriate alcohol to prepare 5. Removal of the catechol protecting group produces 6 which can be converted to 7(A=O, NH or S) by treating 6 with either an appropriate chloroformate or an isocyanate.

The following examples further illustrate the present invention.

EXAMPLE I

PREPARATION of 3,4-DIBENZYLOXY-β-PHENETHYLCARBAMIC ACID, ISOPROPYL ESTER

A. 3,4-Dibenzyloxy-β-phenethylisocyanate

In a 500 ml three necked flask equipped with a gas inlet tube and a Claisen head for distillation were placed 18.5 g (0.05 mole) of benzyloxydopamine hydrochloride in 350 ml of toluene. This was heated to reflux and 150 ml of toluene distilled off. The Claisen head was replaced with a reflux condenser equipped with a drying tube and phosgene was bubbled through the refluxing solution for four hours. The reaction was allowed to stand at room temperature overnight, filtered, and solvent removed in vacuo and the residue purified by a "Kugelrohr" distillation to give 14 g (78%) of 3,4-dibenzyloxy-β-phenethylisocyanate as a light yellow oil, b.p. 180° (0.05 mm).

Analysis Calcd. for $C_{23}H_{21}NO_3$: C, 76.86; H, 5.89; N, 3.90
Found: C, 77.17; H, 5.75; N, 3.90

B. 3,4-Dibenzyloxy-β-phenethylcarbamic acid, isopropyl ester

In a 50 ml flask equipped with a magnetic stirrer and a reflux condenser protected by a drying tube were placed 4.5 g (12.5 mole) of 3,4-dibenzyloxy-β-phenethylisocyanate, 20 ml of benzene, 1.3 ml of dry isopropanol and a crystal of bicyclo [2,2,2] 1,4-diazaoctane. The reaction was heated at reflux for 20 hours. Removal of the solvent left a residue which contained the unreacted isocyanate. The residue was redissolved in 25 ml of benzene, 1.3 ml of isopropanol added and 2 drops of DBU (Aldrich-1,3-diazabicyclo[5,4,0]undec-5 ene) added. This was heated to reflux for 24 hours. The reaction was cooled, diluted with 25 ml of benzene, filtered and the solvent was removed in vacuo. The residue was dissolved in 150 ml of hot cyclohexane and set aside to crystallize. The white solid was filtered off and dried in vacuo to yield 2.1 g of 3,4-dibenzyloxy-β-phenethylcarbamic acid, isopropyl ester, m.p. 80°–83°C.

Analys Calcd. for $C_{26}H_{27}NO_4$: C, 74.44; H, 6.97; N, 3.34
Found: C, 74.68; H, 6.89; N, 3.41

EXAMPLES 2 – 9

The following compounds were prepared according to the method of Example 1 by replacing isopropanol with the appropriate alcohol.

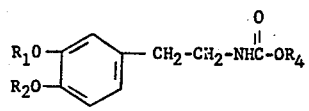

$$R_1O-\underset{R_2O-}{\underset{|}{\bigcirc}}-CH_2-CH_2-NHC(=O)-OR_4$$

| Ex. No. | $R_1$ | $R_2$ | $R_4$ | M.P. | Empirical Formula | Calcd. C | Calcd. H | Calcd. N | Found C | Found H | Found N |
| --- | --- | --- | --- | --- | --- | --- | --- | --- | --- | --- | --- |
| 2 | H | H | $(CH_3)_2CH$ | 91.5–92.5 | $C_{12}H_{17}NO_4$ | 60.25 | 7.11 | 5.86 | 60.13 | 7.25 | 5.77 |
| 3 | H | H | $CCl_3CH_2$ | 155–157 | $C_{11}H_{12}Cl_3NO_4$ | 40.21 | 3.68 | 4.12 | 40.48 | 3.84 | 4.14 |
| 4 | H | H | △—$CH_2$ | 118–119 | $C_{13}H_{17}NO_4$ | 62.07 | 6.81 | 5.57 | 62.20 | 6.51 | 5.59 |
| 5 | H | H | ▷— | 102–104 | $C_{14}H_{19}NO_4$ | 63.42 | 7.7 | 5.28 | 63.40 | 7.99 | 5.71 |
| 6 | H | $C_2H_5C(=O)$— | $C_2H_5$ | 127–129 | $C_{14}H_{19}NO_6$ | 56.64 | 6.40 | 4.71 | 56.71 | 6.44 | 4.60 |
| 7 | $C_6H_5CH_2$ | $C_6H_5CH_2$ | $CH_2CCl_3$ | 127.5–128.5 | $C_{25}H_{24}ClNO_4$ | 59.01 | 4.75 | 2.75 | 59.16 | 4.63 | 2.88 |
| 8 | $C_6H_5CH_2$ | $C_6H_5CH_2$ | $CH(CH_3)_2$ | 80–83 | $C_{26}H_{29}NO_4$ | 74.44 | 6.97 | 3.34 | 74.68 | 6.89 | 3.41 |
| 9 | $C_6H_5CH_2$ | $C_6H_5CH_2$ | $CH_2$—furyl | 71–73 | $C_{28}H_{28}NO_5$ | 73.36 | 6.11 | 3.06 | 73.36 | 5.97 | 3.1 |

EXAMPLE 10

3,4-DIHYDROXY-β-PHENETHYLCARBAMIC ACID, ETHYL ESTER

A solution of 45 g of 3,4-dibenzyloxy-β-phenethylcarbamic acid, ethyl ester, prepared according to the method of Example 1, in 200 ml of ethanol containing 3 g of moist 10% Pd/C was hydrogenated at 40 p.s.i. The reaction was filtered, evaporated to dryness and recrystallized from benzene to yield 18.4 g of product, m.p. 99°–101°.

Analysis Calcd. for $C_{11}H_{15}NO_4$: C, 58.65; H, 6.71; N, 6.22

Found: C, 58.63; H, 6.58, N, 5.98

The compounds useful in the practice of the present invention are generally formulated into pharmaceutical compositions comprising, as an active ingredient, at least one of the active agents in association with a pharmaceutical carrier or diluent. The compounds useful in the practice of the invention exhibit both oral and parenteral activity and can be formulated in dosage forms for oral or parenteral administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents and sweetening, flavoring and perfuming agents.

Preparations according to this invention for parenteral administration include sterile aqueous or non-aqueous solutions, suspensions or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

The dosage of active ingredient in the compositions of this invention may be varied; however, it is necessary that the amount of the active ingredient shall be such that a suitable dosage form is obtained. The selected dosage depends upon the desired thereapeutic effect, on the route of administration, and on the duration of the treatment.

We claim:

1. A method of treating Parkinsonism by administering a therapeutically effective amount of a compound of the formula

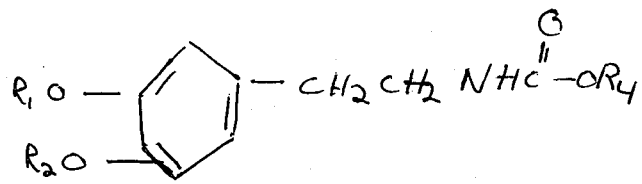

wherein $R_1$ and $R_2$ are the same or different members of the group consisting of hydrogen or benzyl, and $R_7$ is loweralkyl, lowerhaloalkyl, cyclopropylmethyl or cyclopentyl to a patient in need of such treatment.

* * * * *